United States Patent
Schleifstein

[11] Patent Number: 6,153,671
[45] Date of Patent: Nov. 28, 2000

[54] RETROREFLECTIVE ADHERENT PARTICLES AND THEIR USE

[75] Inventor: Robert A. Schleifstein, Edisin, N.J.

[73] Assignee: Potters Industries, Inc., Carlstadt, N.J.

[21] Appl. No.: 09/109,144

[22] Filed: Jul. 2, 1998

[51] Int. Cl.[7] .................................................. C08K 3/00
[52] U.S. Cl. ........................ 523/217; 523/172; 524/494
[58] Field of Search .............................. 524/494; 523/217, 523/172

[56] References Cited

U.S. PATENT DOCUMENTS 4,882,367  11/1989  LaRoche.
4,983,458  1/1991   Dijaiffe.
5,258,071  11/1993  LaRoche.
5,543,177  8/1996   Morrison et al. ........................ 427/288

*Primary Examiner*—Edward J. Cain
*Attorney, Agent, or Firm*—Whitman Breed Abbott & Morgan LLP

[57] ABSTRACT

As an article of manufacture, particulate composites containing, in combination: particles of inorganic material, a component for conferring on the composites the capability of floating in a medium including one or more substance capable of forming a binder matrix, a component for conferring on the composites the capability of adherence to the binder matrix, and a component for conferring on the composites the capability of adherence of the flotation conferring to the inorganic material; their production; and their use in a binder matrix.

33 Claims, No Drawings

RETROREFLECTIVE ADHERENT PARTICLES AND THEIR USE

FIELD OF THE INVENTION

This invention relates to particles of inorganic material which have favorable retroreflectivity and adherence characteristics, to their production and to their use.

In certain more specific aspects, the invention relates to retroreflective and adherent particles for providing increased nighttime visibility of highway markings, signs and other surfaces where retroreflectivity is desired.

BACKGROUND OF THE INVENTION

Retroreflectivity is a phenomenon whereby significant amounts of light irradiating an object are returned back in the direction from which the light comes. This can be achieved on, for example, a traffic marking by using appropriate inorganic materials in particulate form, such as glass beads on the surface of the material. The glass beads are especially advantageous because they act as lenses focusing light onto pigment in the traffic marking and then redirecting the light back to the source.

Inorganic materials, especially vitreous beads, are widely used as additives in polymeric compositions, such as those deposited on highways, to provide retroreflective markers, for instance, edge and lane striping, signs, etc. As is well known, it has become common practice to drop small glass spheres onto a painted line on a highway while the paint is still wet, or at least tacky, such that the spheres are partially embedded in the paint when it has dried. The spheres render the line or other marker retroreflective, and return light from headlights so that the marker is more visible to the motorist. In some cases the spheres are embedded in spherical or irregularly shaped plastic granules prior to being deposited on the paint in the manner disclosed in U.S. Pat. Nos. 3,252,376 and 3,254,563, for example, in an effort further to improve the reflectivity of the marker.

It is known that glass particles greatly increase the visibility of painted markings on roadway surfaces and other painted surfaces when the glass particles are dispersed into the painted surface. Optimum embedment of a glass bead for retroreflectivity and durability is typically 60% of the bead diameter. Less than this can affect durability adversely and more than 60% reduces the retroreflectivity. A surface treatment that "floats" a bead at 60% of its diameter can thus optimize the simultaneous attainment of retroreflective performance and embedment-durability.

A problem encountered with retroreflective particles is an inability of the particles firmly to bind with the paints or other materials into which they are placed. Thus, increased visibility imparted by glass particles can be short-lived due to a steady loss of the glass particles as they are loosened and removed by friction, weather changes and other physical factors.

The loss of glass particles can be slowed by coating the particles with thin layers of certain coupling agents selected for their ability to provide positive adhesion between the particles and surrounding materials. However, utilization of such agents typically entails its own set of disadvantages. Known coupling agents often reduce the retroreflectivity of glass particles by causing a process known as "wicking", whereby paints are drawn onto the glass surface and coat too much of the surface area for sufficient retroreflectivity to be achieved. Although normal road abrasion wears away some of the paint coverage which results from wicking, retroreflectivity never becomes ideal, and in any event is diminished for an undesirably long period of time after the glass is placed. Furthermore, evenly dispersing glass particles into a painted surface can be difficult unless the particles are free-flowing, but known coupling agents often are not hydrophobic and particles coated therewith are subject to moisture-induced agglomeration. Because the particles used are typically so small as to have a powdery appearance, small amounts of moisture can cause the particles to agglomerate and lose important free-flowing properties. Even high relative humidity or condensation on the particle surfaces caused by temperature changes can provide sufficient moisture to cause agglomeration and to interfere with flow properties. Accordingly, this technique for enhancing adherence is frequently problematic.

Another technique for improving retroreflectivity is to blend different glass particles, of the same or different sizes and having coatings conferring different and desired properties or no coating at all. In particular, it would be advantageous to deposit on the paint a mixture of (i) beads coated with a component for facilitating flotation of the beads in the paint, (ii) beads coated with a component for facilitating adherence of the beads to the paint, and (iii) uncoated beads. In this manner, the beads would have a layered distribution in the paint. In principle, the uppermost layer would be the beads coated for flotation, the middle layer would be the uncoated beads and the bottom layer would be the beads coated for adherence. As the paint wears down by friction, weather changes or other physical factors, each layer in turn would be exposed to provide retroreflectivity. Flotation properties are imparted by certain fluorochemicals, which by their insolubility in common solvents in turn impart flotation properties in many paints containing organic solvents or solvent-like vehicles. Unfortunately, these fluorocarbons do not adhere to glass with permanence and migrate onto all available surfaces, including uncoated glass beads. Therefore, this ideal layering cannot be achieved in practice since conventional flotation-coatings migrate to all of the beads in the blend so that all of the beads act as flotation-coated beads.

It would be a substantial advance to provide a particle comprising inorganic material which is both retroreflective and adherent to the polymeric composition in which the filler material is embedded, and the flotation-inducing coating of which does not exhibit undue migration when in admixture with other particles. Moreover, it would be most desirable to increase adhesion of the bead to the paint when flotation-coated beads are used because flotation coatings severely reduce adhesion of glass to paint.

OBJECTS OF THE INVENTION

It is thus an object of the present invention to provide materials capable of producing optimal retroreflectivity and which additionally exhibit improved adhesion to surfaces to which they are applied.

It is a further object of the invention to provide retroreflective materials which are long-lasting, capable of durable embedment in a binder matrix and thoroughly reliable in use.

It is another object of the invention to provide an article of manufacture comprising retroreflective and adherent particles which also have a flotation-coating component that does not migrate to other particles.

It is still another object of the invention to provide a composition comprising a polymeric matrix incorporating retroreflective materials of the invention firmly adherent to the matrix.

It is yet another object of the invention to provide methods of forming such article of manufacture and composition.

These and other objects of the invention will be readily apparent from the following description and claims.

SUMMARY OF THE INVENTION

In one aspect, as an article of manufacture, the present invention is a particulate composite comprising, in combination, a particle of inorganic material, a component for conferring on the composite the capability of floating in a medium including one or more substances capable of forming a binder matrix, a component for conferring on the composite the capability of adherence to the binder matrix, and a component for conferring on the composite a resistance to loss of the flotation component.

In another aspect, the present invention is a multiplicity of particulate composites, each of said composites comprising a particle of inorganic material, a component for conferring on the composite the capability of floating in a medium including one or more substances capable of forming a binder matrix, a component for conferring on the composite the capability of adherence to the binder matrix, and a component for conferring on the composite a resistance to loss of the flotation component.

In a further aspect, the invention is a method of forming a particulate composite, which comprises combining a particle of inorganic material, a component for conferring on the composite the capability of floating in a medium including one or more substances capable of forming a binder matrix, a component for conferring on the composite the capability of adherence to the binder matrix, and a component for conferring on the composite a resistance to loss of the flotation component.

In yet another aspect, the invention is a method of forming a composition exhibiting retroreflectivity, which comprises combining a medium capable of forming a binder matrix, and a multiplicity of particulate composites, each such composite comprising: a particle of inorganic material, a component for conferring on the composite the capability of floating in a medium including one or more substances capable of forming a binder matrix, a component for conferring on the composite the capability of adherence to the binder matrix, and a component for conferring on the composite a resistance to loss of the flotation component.

Practice of the invention enables realization of several important advantages. The particulate composites of the present invention provide good retroreflectivity in combination with improved adhesion to the surfaces with which they are typically in contact during use. The invention, while of general application, is particularly effective in adding retroreflectivity to roadway markings such that nighttime visibility of such markings is greatly improved. Furthermore, the components of the particulate composites do not migrate to any appreciable extent to other particles not having similar components when in admixture with one another. Moreover, the particulate composites of the present invention are advantageously free-flowing, providing a significant benefit especially under humid application conditions.

DESCRIPTION OF CERTAIN PREFERRED EMBODIMENTS

A central feature of the invention is the incorporation, in the aforementioned particulate composite, of a component which imparts flotation properties to the composite. Typically, this medium in which flotation is desired is a paint stripe laid down on a road surface as a lane marker, or the like. The medium is generally liquid initially, and contains (i) one or more substances which are capable of forming a binder matrix upon curing (e.g., drying), (ii) pigmentation, and (iii) a solvent component to achieve the initial liquidity. (For example, the medium includes one or more active ingredients which by cross-linking, polymerization, copolymerization or other chemical reaction form a solidified binder matrix.) The particles of the invention are typically deposited on the medium while it is still in liquid form, so that they can distribute themselves in the medium before it cures and solidifies. Because the inventive particulate composites incorporate a flotation component, the composites do not sink to the bottom (e.g., the lower portion of the medium nearer a material on which the medium is deposited), but rather hover in the upper portion of the medium (i.e., on or near the surface opposite the material on which the medium is deposited) so that when solidification occurs they are embedded at such location.

Flotation occurs as a result of surface tension of the particulate composite in the binder medium such that the binder medium, especially solvent in the medium, is unable to wet the composite adequately. Substances which increase such surface tension - while at the same time not detrimentally affecting the retroreflectivity of the composites or its capability to adhere to the binder matrix in which it is to be embedded—are suitable, and can be identified empirically by one of ordinary skill in the art without undue experimentation. The component is preferably a fluorochemical, such as 1,1,2-trichloro-1,2,2-trifluoroethane telomer B phosphate diethanolamine salt (commercially available under the name ZONYL® RP from DuPont Chemicals, Wilmington, Del.). Another example of a suitable "flotation" component material is Milease F-53 (commercially available from ICI Chemical Corp., Wilmington, Del.).

Another central feature of the invention is the incorporation of a component for conferring adherence properties. As indicated previously, it is desirable that the retroreflective composites of the invention be firmly embedded in the matrix (e.g., paint stripe) in order to retard their displacement from the composition due to friction, abrasion, etc. (resulting, for instance, from the passage of vehicles thereover). It is particularly advantageous that, in accordance with the invention, both the flotation characteristics described above and the aforementioned adherence properties are achieved simultaneously. The desired adherence properties are achieved through the bonding of the "adherence" component of the inventive composite with the binder matrix. Suitable substances are those capable of forming such bond (appropriate substances can of course vary, depending on the nature of the binder matrix), without detrimentally affecting retroreflectivity or flotation properties, and can be identified empirically by one of ordinary skill in the art without undue experimentation. Advantageously, the component conferring adherence properties is selected to be effective with the broadest feasible range of adhesion binders. The component in question is preferably an organoreactive silane, such as N-2-(vinylbenzylamino)-ethyl-3-aminopropyltrimethoxysilane monohydrogen chloride (commercially available under the name Z-6032 from Dow Corning Corporation, Midland, Mich.). Other examples of suitable materials are 3-methacryloxypropyltrimethoxy silane (commercially available under the name Z-6030 from Dow Corning Corporation, Midland, Mich.) and 3-aminopropyltrimethoxy silane (commercially available under the name CA-0800 from Sivento Inc., Lawrenceville, Ga.).

A further and highly significant feature of the invention is the incorporation of a component which preferably prevents or minimizes loss of the flotation component from the composite. It is highly important to provide retroreflective and adherent composites from which the flotation component does not migrate to other particles.

This is an especially advantageous feature when the inventive composite is in admixture with other particles, because migration of the flotation component from the inventive composites to other particles is blocked in whole or at least substantial part. While not intending to be bound by the following theory, I believe that the "non-migrating" aspect is principally physical in that the blocking component deposited on the inorganic material forms (in effect) a barrier which prevents or restricts migration of the flotation component without chemically reacting with that latter component. Substances which have such capability, without detrimentally affecting the retroreflectivity and adherence properties of the composites, are broadly suitable. However, in certain preferred embodiments the blocking component is preferably a hydroxy-functional silicone, especially a low molecular weight silicone intermediate (e.g., that commercially available under the name Z-6018 from Dow Corning Corporation, Midland, Mich.).

The inorganic material particle with which the aforementioned components are combined can be of any suitable shape and size adapted to the particular application, but often is a bead, flake, multi-faceted object or the like. The term "particle" as used herein refers to a small quantity of matter which can be spheroidal (such as spherical), geometrical, or irregular in shape. The particle can be fashioned of any suitable material, such as a mineral substance, but is preferably vitreous. Examples of suitable vitreous materials are inorganic glass materials, especially those which are non-hygroscopic. Glasses such as A-glass (soda lime glass), C-glass (chemically resistant glass) and E-glass (borosilicate glass) are included. Also, other non-hygroscopic materials such as minerals (e.g., ceramics) are suitable for practicing the invention.

For the purpose of this invention, inorganic material particles (e.g., glass beads) ranging in maximum dimension from 100 microns ($\mu$m) to 4 millimeters (mm) are preferred. More preferred are particles ranging from about 125 $\mu$m to 1000 $\mu$m in maximum dimension, especially from about 175 $\mu$m to 800 $\mu$m maximum dimension.

The flotation component is typically included in the composite in an amount effective to impart satisfactory flotation without detrimentally affecting retroreflectivity or adherence to any material extent when the composite is combined with the binder matrix. Preferably, the amount of flotation component utilized is selected to cause from 55–65 volume % of the composite to be embedded, and more preferably about 60 volume %. The amount is suitably 0.01 g to 0.15 g per kg of 20–80 mesh (U.S.) composites, especially 0.03 g to 0.08 g per kg of such composites.

The adherence component(s) is/are typically included in the particle in the composite in an amount effective to promote satisfactory adherence of the composite to the binder matrix. The amount is/are preferably 0.05 g to 0.75 g per kg of 20–80 mesh (U.S.) composites, especially 0.15 g to 0.4 g per kg of such composites.

The component for maintaining the flotation component in association with the inorganic material is typically included in the composite in an amount effective to block any appreciable migration without diminishing adherence appreciably. This amount is preferably 0.1 g to 1.5 g per kg of 20–80 mesh (U.S.) particles, especially 0.3 g to 0.8 g per kg of such particles.

The components on the inorganic material can be in the form of a coating or layer, such components being substantially uniformly intermixed on the particulate core material. However, in other embodiments of the invention the components applied to the inorganic material form substantially discrete deposits, or within a coating or layer form zones in which one or another of the components is relatively concentrated. Some or all of the foregoing conditions can suitably exist simultaneously in the same coating, layer or deposition. The coating or layer can be substantially continuous over the surface of a particulate core material (including without limitation embodiments in which the coating or layer is continuous over the entire surface of the particulate core material), but in certain other embodiments the coating is discontinuous, with the proviso that the coating covers sufficient portions of the core material particles to confer the desired flotation, adherence and migration-resistance characteristics.

It will be appreciated that the amount of the components incorporated in the particulate composites of the invention will typically increase, all other things being equal, with a decrease in particle size of the inorganic material as each particle will thus have more surface area.

The binder matrix (such as polymeric composition) in which the particulate composites are embedded is, for example, any typical paint resin, such as latex paint, or other film-forming material, for instance, an epoxy resin, a polyester resin, a polymethylmethacrylate resin, a chlorinated rubber resin, a polyurethane resin or a hot melt adhesive.

The surface upon which the reflective particles and the medium for receiving same are deposited can be any surface or portion of a surface, especially one to which the binder matrix will adhere. For example, the surface can be a paved surface such as the surface of a road or parking lot. The surface can be asphalt, concrete or the like.

The reflective particulate composites are typically deposited on the aforementioned medium (e.g., road surface marking material) when the latter is in a wet or tacky state; the medium is typically flowable at the time of application, such that it can be laid down in any desired pattern. This permits the composites to settle into the medium so that they are dispersed therein to the desired extent. Then, the medium cures or dries to fix the composites on the pavement surface, i.e., to hold the composites firmly in position to provide an extremely effective reflective system. Because the composites of the invention have a flotation capability, some of them protrude from the material on which they are deposited after it cures (an embedment of 55–65 volume %, especially about 60 volume %, of the composite being preferred). Reflective composites adhered to a pavement marking reflect light from a vehicle headlight. As will be appreciated, retroreflective performance of a composite-containing striping material in accordance with the invention can be quantified by using a retroreflectometer. Tests to measure flotation effects of a surface treatment can be conducted using monosized particles (e.g., treated beads) dropped in measured quantities onto a wet binder film at least the thickness of the particle's maximum dimension (e.g., bead diameter). This latter measure assures that untreated or unacceptably treated particles which do not float sufficiently will be fully engulfed by the wet binder and thus have no retroreflectivity initially in effect.

The composites of the invention can be applied while the viscosity of the medium (including one or more substances capable of forming the binder matrix) is still relatively low. As the medium dries and hardens, the composites are maintained in place in the upper portion of such medium by their flotation capability, and upon curing the composites adherence capability maintain the desired embedment in the polymeric material. Accordingly, in certain good embodiments of the invention, the retroreflective composites of the present invention comprise glass or other inorganic material coated with a composition capable of providing flotation in the medium where such composites are initially de posited, and strong adhesion between the composites and the binder in which the composites are ultimately embedded. The coating typically includes a fluorochemical for flotation, an organoreactive silane for adherence and a hydroxy-functional silicone for prevention of migration of the flotation component.

In other good embodiments, a multiplicity of such composites is provided, or blends of such composites with uncoated particles and/or particles coated with fewer than all of the foregoing components and/or one or more other components.

In certain additional good embodiments of the invention, the composites of the invention are used in admixture with other particles not treated in accordance with the invention. When in the aforementioned medium applied to a road surface or the like, the latter particles descent through the medium and eventually assume a position closer to the surface than that occupied by the composites. After curing, as the solidified matrix (e.g., pavement marking) is exposed to wear, composites held in the upper matrix—i.e., opposite the road surface, etc.—are dislodged when the matrix material is removed, but the particles thereunder (not treated with the flotation component) eventually emerge in turn to provide good reflectivity. In some instances, the particles not in accordance with the invention are suitably in combination of particles untreated and/or particles treated with a component for adherence to the matrix. The particles treated for adherence settle to a position proximate the surface on which the medium is deposited with the untreated particles occupying a position intermediate the particles treated for adherence and the composites in accordance with the invention.

The amounts of the respective components incorporated are sufficient to yield an amount of each such component in the particle as disclosed in preceding paragraphs. The combination of the other components with the inorganic material substrate may be a one-step or a multi-step process. In the one-step process, the components are simultaneously combined prior to curing. In the multi-step process, the components are combined in a plurality of steps, with the inorganic material and one or more of the other components being combined first, and then the other(s) later either separately or together in one or more follow-on steps. Typically, the inorganic material and other components are mixed together in a rotary mixer; however, other mixing apparatus which is capable of effectively administering these components (especially the heavy mixture of all of them combined) is suitable.

A solvent can be incorporated in the mixture to improve its rheology if necessary or desirable. The solvent can be any suitable conventional substance. Typically, the solvent is an alcohol, advantageously methanol. The solvent is typically included in an amount sufficient to dissolve the remaining components, preferably, from 0.3 g to 2.0 g solvent per kg of 20–80 mesh (U.S.) particles, especially 0.5 g to 1.4 g per kg of such particles.

Curing to form the composites typically involves heating the inorganic material particle bearing the components facilitating flotation, adherence and compatibility as aforesaid at a temperature in the range from 50° C. to 200° C., preferably 60° C. to 80° C., for a time of from 1 to 25 minutes, preferably 2 to 5 minutes, though other suitable temperatures and times can be utilized to give the desired result (these can be determined empirically by one of ordinary skill in the art without undue experimentation). Exposure of the materials to a temperature of at least 60° C. in connection with curing also has the highly beneficial result that the components on the inorganic material particle become dry and hard such that a multiplicity of the composites is free-flowing.

The present invention is further described and illustrated in the following examples. Further objects, together with additional features and advantages, will be apparent.

EXAMPLE 1

Preparation of Particulate Composites 19.2 g of methanol was warmed to 30° C. 10.0 g of Z-6018 was added to the methanol and stirred to form a solution. The solution was cooled to room temperature. 4.8 g of CA-0800 plus 0.2 g of Z-6030 was added and dissolved in the solution. Then, 1.0 g of Zonyl RP was added and dissolved in the solution.

1 kg of 20–80 mesh (U.S.) beads was charged into a clean stainless steel tumbler. The tumbler had an explosion-proof motor and heating system. Proper ventilation was provided. Tumbling of the beads was begun without heating.

2.5 g of the solution were added to the tumbler to coat the beads. The mixture was tumbled for 2 minutes at room temperature, and then the coated beads were heated with agitation to a temperature of 80° C., and then allowed to cool.

EXAMPLE 2

Flotation Test Procedure

As a first approximation, a single layer of coated beads was spread in a clean shallow container, such as a Petri dish. Xylene was introduced slowly and carefully with a syringe onto the edge of the container so as not to agitate the surface of the liquid. The end of the syringe was maintained below the surface of the xylene while adding additional xylene. A sufficient quantity of xylene was introduced into the container so that any beads which can are free to float away from the bottom of the container. The percentage of floating beads (by number compared to non-floating beads) was estimated and recorded.

For a more accurate determination, a sample of approximately 1 g ±0.0005 g of beads was evenly distributed into a clean standard 100 mm glass Petri dish previously tared to ±0.0005 g. The dish was vibrated slightly to attain as near as possible a monolayer of beads. Xylene, C.P. Grade, was introduced at one side of the dish at a rate of 10 to 15 ml per minute from a burette until 30 ml was added. The floating beads were then carefully drawn off by suction through a suitably constricted delivery tube connected to a receiving flask. Excess xylene was drawn off so that no remaining beads were lost and the dish dried in an oven at 100±5° C. The dish was weighed and the percentage of floating beads calculated.

EXAMPLE 3

Migration Test Procedure 35.0 g of the coated beads of Example 1 were weighed out on a top loading balance and placed in an 8 oz. plastic container. Similarly, 35.0 g of −12/+14 mesh (U.S.) uncoated beads were weighed out and placed into the same plastic container. The container was capped and shaken for thirty minutes on a wrist-action shaker. The beads were then screened to separate the −12/+14 mesh beads using standard testing sieves.

EXAMPLE 4

No Migration of Flotation Component

The −12/+14 mesh beads recovered from Example 3 were tested for flotation by the test procedure of Example 2. No floating beads were found.

Accordingly, the flotation-facilitating component did not migrate from the coated beads to the uncoated beads in admixture with the coated beads.

EXAMPLE 5

Retroreflective Performance

Retroreflectivity of the particulate composites of Example 1 ("210-65C") was compared with that of uncoated beads ("None") and beads treated with methacryl- or amino-silane in various paints as follows:

| Coating | Retroreflectivity (mcd/m$^2$/lux) |
|---|---|
| 1. Cuba White Polyester 30 mil blade/6 lb./gal./20–80 mesh beads | |
| None | 30.4 |
| 210-65C | 692.7 |
| 2. "Werra" S.A.R. Solvent Acrylic 30 mil blade/12 lb./gal./20–80 beads | |
| None | 438 |
| methacrylsilane | 366 |
| 210-65C | 637 |
| 3. Epoplex Epoxy 30 mil blade/12 lb./gal./20–80 beads | |
| None | 264 |
| aminosilane | 433 |
| 210-65C | 520 |
| 4. Follman Precocryl PMMA 30 mil blade/12 lb./gal./511 beads | |
| None | 446 |
| methacrylsilane | 313 |
| styrylaminosilane | 445 |
| 210-65C | 532 |

In each instance the beads of the present invention provided superior retroreflectivity.

EXAMPLE 6

"Push-Out" Test Procedure/Performance

The "push-out" test is a method developed by Potters Industries to quantify differences in adhesion of various surface-treated glass beads to various pavement marking materials. The surface treatment materials typically can be silicones, fluorocarbons, silanes or zirconates. The pavement marking materials are typically solvent-based or water-based paints.

The Instron® device is a physical test instrument that, when adapted with a load cell, can measure the force required to push a glass bead out of cured striping binder. The methodology is selectively to embed monosized glass beads with various surface treatments at a depth of 10% to 30% of their respective diameters and then measure the force required to push each bead out of the film. The force measured is the force parallel to the plane of the striping substrate. The load cell on the Instron® device can measure the force in grams required to push out each bead and can differentiate among adhesion ratings for various surface treatments on the glass beads.

Using an Instron® instrument, "push-out" performance of the particulate composites of Example 1 ("210-65C") was compared with that of uncoated beads ("Uncoated") and beads containing other coatings (styrylamino silane, methacryl silane, flotation inducing agent) in various paints as shown in Table 1.

TABLE I

"PUSH-OUT" PERFORMANCE OF FLOTATION/ADHERENCE COATING (210/65C)
−12+14 BEADS "NORMALIZED" VALUES PUSH-OUT STRENGTHS

| | | COATING | | | | |
|---|---|---|---|---|---|---|
| BINDER | THICKNESS (in.) (Wet) | UNCOATED | STYRYLAMINO-SILANE | METHACRYL-SILANE | FLOTATION | 210-65C |
| Cuba Polyester | 0.010 | 100 | 505 | 1210 | 29 | 459 |
| Cuba Polyester | 0.005 | 100 | 130 | 361 | 115 | 213 |
| Baltimore Polyester | 0.010 | 100 | 175 | 576 | 21 | 258 |
| S.A.R. (France) Solvent Acrylic | 0.010 | 100 | 98 | 100 | — | 99 |
| Limburger K-794 (Germany) Solvent Acrylic | 0.010 | 100 | 106 | 99 | 48 | 64 |

TABLE I-continued

"PUSH-OUT" PERFORMANCE OF FLOTATION/ADHERENCE COATING (210/65C)
−12+14 BEADS "NORMALIZED" VALUES PUSH-OUT STRENGTHS

| | | | COATING | | | |
|---|---|---|---|---|---|---|
| BINDER | THICKNESS (in.) (Wet) | UNCOATED | STYRYLAMINO- SILANE | METHACRYL- SILANE | FLOTATION | 210-65C |
| Follman Precoline LAF-62 (Germany) Alkyl/Chlorinated Rubber | 0.020 | 100 | 101 | 95 | 84 | 140 |
| Follman Precocryl PMMA (Germany) | 0.010 | 100 | 104 | 80 | 57 | 76 |

As can be seen, in each instance the composites of the present invention provided superior "push-out" performance compared to conventional flotation coated beads and comparable "push-out" performance to beads having only an adhesion coating without a flotation coating.

In will be appreciated that variations and modifications of the embodiments disclosed herein can be made by the skilled person without departing from the spirit or scope of the invention as defined in the following claims.

What is claimed is:

1. As an article of manufacture, a particulate composite comprising, in combination,
    a particle of inorganic material,
    a component for conferring on the composite the capability of floating in a medium including one or more substances capable of forming a binder matrix,
    a component for conferring on the composite the capability of adherence to the binder matrix, and
    a component for conferring on the composite a resistance to the loss of the flotation component.

2. The particulate composite as defined in claim 1, wherein said flotation conferring component is a fluorochemical, wherein said flotation conferring component is a fluorochemical selected from the group consisting of 1,1,2-trichloro-1,2,2-trifluoroethane telomer B phosphate diethanolamine salt and a fluoroalkyl polymer known as Milease F-53.

3. The particulate composite as defined in claim 1, wherein said adherence conferring component is an organoreactive silane.

4. The particulate composite as defined in claim 1, wherein said resistance conferring component is a hydroxyfunctional silicone.

5. The particulate composite as defined in claim 1, wherein the binder matrix is a polymeric compositions.

6. The particulate composite as defined in claim 1, wherein the inorganic material in particulate form is a vitreous bead.

7. A multiplicity of particulate composites, each of said particulate composites comprising, in combination,
    a particle of inorganic material,
    a component for conferring on the composites the capability of floating in a medium including one or more substances capable of forming a binder matrix,
    a component for conferring on the composites the capability of adherence to the binder matrix, and
    a component for conferring on the composites a resistance to the loss of the flotation component.

8. A multiplicity of particulate composites as defined in claim 7, which further comprises said particulate composites in combination with the binder matrix.

9. A multiplicity of particulate composites as defined in claim 8, wherein the binder matrix is an epoxy resin.

10. A multiplicity of particulate composites as defined in claim 8, wherein the binder matrix is a polyester resin.

11. A multiplicity of particulate composites as defined in claim 8, wherein the binder matrix is a polymethylmethacrylate resin.

12. A multiplicity of particulate composites as defined in claim 8, wherein the binder matrix is a chlorinated rubber resin.

13. A multiplicity of particulate composites as defined in claim 8, wherein the binder matrix is a polyurethane resin.

14. A composition comprising a multiplicity of particulate composites embedded in a binder matrix, each of said particulate composites comprising, in combination,
    a particle of inorganic material,
    a component for conferring on the composites the capability of floating in a medium including one or more substances capable of forming a binder matrix,
    a component for conferring on the composites the capability of adherence to the binder matrix, and
    a component for conferring on the composites the capability of adherence to the flotation conferring component.

15. A composition as defined in claim 14, wherein the multiplicity of particulate composites has a retroreflectivity of at least 500 mcd/m$^2$/lux.

16. A composition as defined in claim 14, wherein the multiplicity of particulate composites has a normalized push-out strength of at least 100.

17. A composition as defined in claim 14, further comprising a multiplicity of particles of inorganic material which are not treated with a component which confers the capability of flotation in a medium including one or more substance capable of forming a binder matrix.

18. A composition as defined in claim 17, wherein the multiplicity of particles is uncoated.

19. A composition as defined in claim 17, wherein the multiplicity of particles are treated with a component conferring the capability of adherence to the binder matrix.

20. A composition as defined in claim 17, wherein the multiplicity of particles comprise a blend of uncoated particles of inorganic material and particles of inorganic material treated with a component conferring the capability of adherence to the binder matrix.

21. A composition as defined in claim 20, wherein
    the binder matrix is a polymeric material;
    an upper portion of the composition contains primarily particulate composites which comprise, in combination, particles of inorganic material, a component for conferring on the composites the capability of floating in a medium including one or more substances capable of forming the polymeric material, a component for conferring on the composites the capability of adherence to the polymeric material, and a component for conferring on the composites the capability of adhering the flotation conferring component to the particles, a middle portion of the composition contains primarily the uncoated particles of inorganic material; and a bottom portion of the composition which contains primarily the particles of inorganic material treated with a component for conferring on the capability of adherence to the polymeric material.

22. A method of forming particulate composite, which comprises combining: a particle of inorganic material; a component for conferring on the composite the capability of floating in a medium including one or more substances capable of forming a binder matrix; a component for conferring on the composite the capability of adherence to the binder matrix; and a component for conferring on the composite the capability of adherence to the flotation conferring component.

23. A method as defined in claim 22, further comprising curing the flotation and adhesion conferring components.

24. The method as defined in claim 22, wherein said flotation conferring component is a fluorochemical, wherein said flotation conferring component is a fluorochemical selected from the group consisting of 1,1,2-trichloro-1,2,2-trifluoroethane telomer B phosphate diethanolamine salt and a fluoroalkyl polymer known as Milease F-53.

25. The method as defined in claim 22, wherein said binder matrix adhesion conferring component is an organoreactive silane.

26. The method as defined in claim 22, wherein said component capable of adhering the particle to the flotation conferring component is an organoreactive silane.

27. A method as defined in claim 22, which further comprises combining said components and a solvent for each component.

28. The method as defined in claim 27, wherein the solvent is an alcohol.

29. The method as defined in claim 28, wherein the alcohol is methanol.

30. The method as defined in claim 22, wherein the particle of inorganic material is a vitreous bead.

31. A method of forming a retroreflective article, which comprises combining a medium capable of forming a binder matrix, and a multiplicity of particulate composite, each such composite comprising:

a particle of inorganic material, a component for conferring on the composite the capability of floating in a medium including one or more substances capable of forming a binder matrix, a component for conferring on the composite the capability of adherence to the binder matrix, and a component for adhering the flotation conferring component to the composite.

32. A method as defined in claim 31, which further comprises the step curing the medium, after combination with the particles, to form said binder matrix.

33. A method as defined in claim 32, wherein said curing step comprises permitting the medium to dry such that said binder matrix is formed.

* * * * *